United States Patent [19]

Ogawa et al.

[11] Patent Number: 4,665,487
[45] Date of Patent: May 12, 1987

[54] UNMANNED VEHICLE CONTROL SYSTEM AND METHOD

[75] Inventors: Hiroshi Ogawa; Yasuyuki Miyazaki, both of Aichi; Susumu Yoshida, Kakamigahara, all of Japan

[73] Assignee: Kabushiki Kaisha Meidensha, Tokyo, Japan

[21] Appl. No.: 704,421

[22] Filed: Feb. 22, 1985

[30] Foreign Application Priority Data

May 25, 1984 [JP] Japan ................. 59-105911
May 25, 1984 [JP] Japan ............. 59-76916[U]

[51] Int. Cl.⁴ .......................................... G06F 15/50
[52] U.S. Cl. ........................... 364/424; 180/168; 180/142; 318/587
[58] Field of Search ............. 364/424, 425; 180/167, 180/168, 169, 141, 142, 143; 318/587

[56] References Cited

U.S. PATENT DOCUMENTS 4,307,329 12/1981 Taylor ............................ 180/168
4,329,632 5/1982 Yoshida et al. ................. 318/587
4,392,540 7/1983 Michio et al. ................... 180/142
4,476,529 10/1984 Nakamura et al. ............. 180/142

4,538,698 9/1985 Hashimoto et al. ............ 180/143

Primary Examiner—Gary Chin
Attorney, Agent, or Firm—Schwartz, Jeffery, Schwaab, Mack, Blumenthal & Evans

[57] ABSTRACT

An unmanned vehicle is so controlled as to travel along a guide line in response to command signals transmitted from a fixed host computer. The steering misalignment (offset) of the vehicle is corrected by a steering DC motor driven by an AC current, the duty ratio of which is adjusted by a steering motor chopper circuit. Since dead zones within which the misalignment is no longer corrected and duty ratio calculating expression on which chopper duty ratio is determined according to a detected offset are both classified by vehicle speed, it is possible to stably correct vehicle steering misalignment at high response speed even when the vehicle is travelling at high speed along the guide line. Further, when the dead zone and the calculating expression are both classified by discriminating an initial offset from the succeeding offset, it is possible to not only to prevent the vehicle from travelling zigzag along the guide line, but also to reduce the number of rush currents generated in the chopper circuit.

4 Claims, 8 Drawing Figures

UNMANNED VEHICLE CONTROL SYSTEM AND METHOD

BACKGROUND OF THE INVENTION

1. Field of the Invention

The present invention relates generally to an unmanned vehicle control system and the method, and more specifically to a steering device control system and the method incorporated with the unmanned vehicle control system. The unmanned vehicle is a forklift truck, for instance, which is automatically remote-controlled so as to travel along a fixed guide line in response to various command signals transmitted from a fixed host computer. The unmanned vehicle is used for conveying material, semi-finished products, etc. in an unmanned factory, warehouse, etc.

2. Description of the Prior Art

In general, an unmanned vehicle is driven along fixed guide lines. An alternating current having an appropriate frequency (e.g. 10 kc) is passed through the guide lines to generate a magnetic field near the guide lines. A pair of magnetic field detecting coils are disposed symmetrically with respect to the longitudinal axis of the vehicle body in order to detect a vehicle offset produced when the vehicle skews or is misaligned away from the guide line. To detect vehicle offsets (misalignment) from the guide line, the difference in magnetic field intensity between the two symmetrically-arranged coils is detected. In response to the detected difference signal indicative of vehicle offset, a steering device mounted on the vehicle is actuated by a steering motor so that a detected offset value may be reduced into within a dead zone (offset is no longer adjusted). The speed of the steering DC motor can be adjusted by a chopper circuit. The chopper circuit can generate a chopped current the duty ratio of which is freely adjustable by controlling the inputs of the chopper circuit. In other words, when the vehicle is misaligned to the right side, for instance, the duty ratio of the chopper circuit is calculated according to the magnitude of the detected offset, and the steering motor is driven in the direction that the offset is reduced at an appropriate motor speed.

In the prior-art steering device control system, however, since the dead zone is fixedly determined and additionally the speed of steering motor is simply adjusted according to the magnitude of the detected offset value irrespective of vehicle speed, there exist some shortcomings. The basic problems are: When the vehicle is travelling at high speed, the dead zone is reduced in reality and the vehicle misalignment is excessively adjusted repeatedly, so that the vehicle travels zigzag at high speed and additionally large rush currents will often be generated in the steering chopper circuit. The generated rush currents may damage the chopper circuit. On the other hand, in the case where the dead zone is determined wider, it is impossible to finely control the steering operation at low vehicle speed. In summary, in the prior-art steering control system, it is impossible to stably correct the steering misalignment throughout a wide vehicle speed range.

SUMMARY OF THE INVENTION

With these problems in mind, therefore, it is the primary object of the present invention to provide an unmanned vehicle control system and method which can stably correct the vehicle steering misalignment at high response speed throughout a wide vehicle speed range from low to high.

To achieve the above-mentioned object, the unmanned vehicle control system according to the present invention comprises: (a) steering motor means for steering the unmanned vehicle; (b) steering motor chopper means for generating a chopped current supplied to said steering motor means, speed of said steering motor means increasing with increasing duty ratio of the chopped current; (c) vehicle offset detecting means for detecting an offset value of the unmanned vehicle misaligned away from the fixed guide line and generating an offset signal when the vehicle skews to the guide line; (d) vehicle speed detecting means for detecting vehicle speed and generating a vehicle speed signal; and (e) computer means having steering control interface means for activating said steering motor chopper means in response to the offset signal generated from said vehicle offset detecting means and the vehicle speed signal generated from said vehicle speed detecting means, said microcomputer determining dead zone within which the detected offset is no longer controlled in such a way as to increase the dead zone with increasing vehicle speed and further the duty ratio of the chopped current in such a way as to increase the duty ratio with decreasing vehicle speed.

To achieve the above-mentioned object, the method of controlling an unmanned vehicle along a fixed line according to the present invention comprises the following steps of: (a) detecting an offset value of the unmanned vehicle misaligned away from the fixed guide line; (b) detecting a vehicle speed; (c) comparing the detected vehicle speed with a first reference value; (d) if the detected vehicle speed is less than the first reference value, setting a low speed dead zone and a low speed duty ratio expression; (e) if the detected vehicle speed is more than the first reference value, comparing the detected vehicle speed with a second reference value greater than the first reference value; (f) if the detected vehicle speed is less than the second reference value, setting a medium speed dead zone and a medium speed duty ratio expression; (g) if the detected vehicle speed is more than the second reference value, setting a high speed dead zone and a high speed duty ratio expression; (h) comparing the calculated offset with the set dead zone; (i) if the calculated offset is less than the set dead zone, turning off the steering motor chopper; (j) if the calculated offset is more than the set dead zone, calculating an appropriate duty ratio of the chopped current supplied to the steering motor according to the detected offset value and in accordance with the set duty ratio expression; and (k) turning on the steering motor chopper for a predetermined time period on the basis of the calculated duty ratio; and (l) repeating the above steps.

BRIEF DESCRIPTION OF THE DRAWINGS

The features and advantages of the unmanned vehicle control system and method according to the present invention over the prior art system and method will be more clearly appreciated from the following decription of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

With reference to the attached drawings, reference is now made to a first embodiment of the unmanned vehicle control system according to the present invention.

Figure 1:
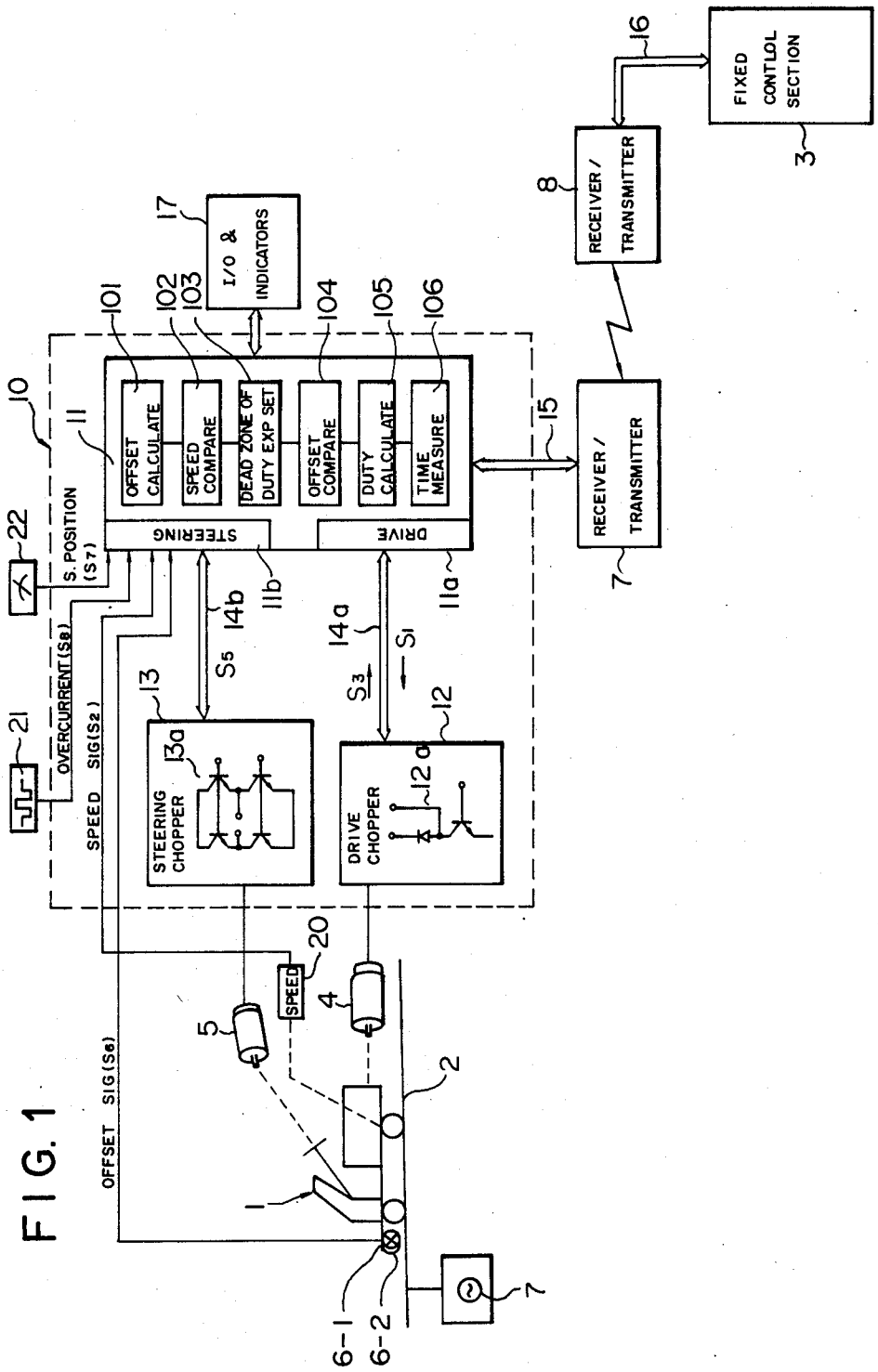
FIG. 1 is a diagrammatical view including a schematic block diagram of an unmanned vehicle control system according to the present invention.

In FIG. 1, an unmanned vehicle 1 is remote-controlled so as to travel along a fixed guide line 2 in accordance with various command signals generated by a fixed control section (host computer) 3. The vehicle 1 is driven by a driving motor 4 in the forward or rearward direction and further controlled by a steering motor 5 so as to be aligned with the fixed guide line 2 by the aid of a pair of offset detecting coils 6 and a guide line oscillator 7 as described in more detail later with reference to FIGS. 2(A) and 2(B).

The driving motor 4 and the steering motor 5 are both controlled by a movable control section 10. The movable control section 10 communicates with the fixed control section 3 through a movable receiver/transmitter 7 connected to the movable control section 10 and a fixed receiver/transmitter 8 connected to the fixed control section 3.

The movable control section 10 includes a main microcomputer (CPU) 11, a driving motor control unit 12 and a steering motor control unit 13. The main computer 11 is connected to the driving motor control unit 12 through a data bus 14a and to the steering control unit 13 through another data bus 14b. Further, the reference numeral 15 denotes another data bus connected between the movable main computer 15 and the movable receiver/transmitter 7, the numeral 16 denotes another data bus connected between the fixed control section (host computer) 3 and the fixed receiver/transmitter 8. The reference numeral 17 denotes an input/output unit including indicators, through which various command signals peculiar to the movable vehicle 1 are inputted or outputted. The reference numeral 20 denotes a vehicle speed sensor. In the above unmanned vehicle control system, only a single vehicle is shown; however, the fixed control section (host computer) 3 controls a plurality of unmanned vehicles movable along plural fixed guide lines complicatedly laid within an unmanned factory or warehouse. Further, the movable vehicle 1 can be controlled not only by the fixed host computer 3 but also by the main computer 11 independently or manually (because the vehicle is provided with an accelerator pedal, a steering wheel, etc.). The communication between the fixed host computer 3 and the movable main computer 11 is made by the medium of radio wave, optical communication, etc.

The driving motor control unit 12 includes a driving motor transistor chopper circuit 12a. The chopper circuit 12a converts a DC voltage into an AC voltage by intermittently cutting off the DC voltage in response to input signals applied from the main computer 11 to bases of chopper transistors. The duty ratio of chopper current controls the speed of the DC driving motor 4. That is to say, the greater the duty ratio, the faster the DC driving motor 4 rotates. Further, in this chopper circuit 12a, the direction in which current flows is not switched. The direction that the driving motor 4 rotates is switched by a pair of other switches (not shown) provided for the driving DC motor 4.

The steering motor control unit 13 includes a steering transistor chopper circuit 13a. Similarly, the chopper circuit 13 converts a DC voltage into an AC voltage by intermittently cutting off the DC voltage in response to input signals applied from the main computer 11. The duty ratio of the chopped voltage controls the speed of the DC steering motor 5. That is to say, the greater the duty ratio, the faster the DC steering motor 5 rotates. Being different from the driving motor transistor chopper circuit 12a, the steering motor chopper circuit 13a can change the direction in which current flow. This is because it is necessary to quickly change the direction that the steering motor 5 rotates in the case of the steering operation.

Figure 2:
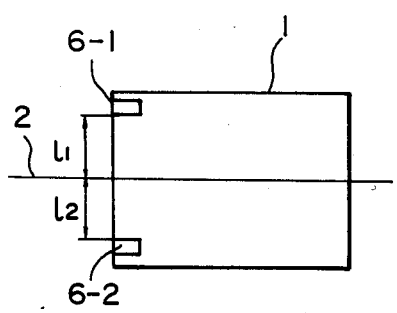
FIG. 2(A) is a diagrammatical view for assistance in explaining a vehicle travelling along a fixed guide line without offset.
FIG. 2(B) is a diagrammatical view for assistance in explaining vehicle misaligned away from a fixed guide line having offset.
Figure 2:
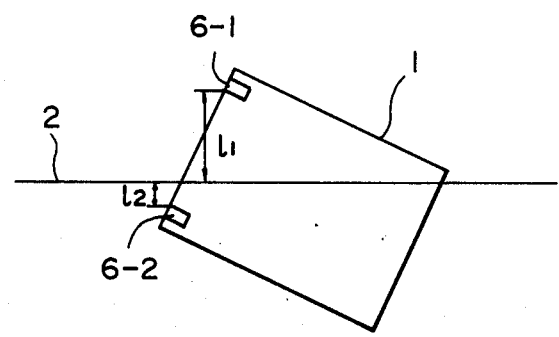

The operation of the offset detecting coils 6 will be described in more detail with reference to FIGS. 2(A) and 2(B). The two offset detecting coils 6-1 and 6-2 are disposed symmetrically with respect to the longitudinal axis of the vehicle body. An AC current having an appropriate frequency (e.g. 10 kc) is passed through the guide line 2 to generate an alternating magnetic field. When the vehicle 1 is travelling correctly being aligned with the guide line 2, as shown in FIG. 2(A). Since a first distance $l_1$ between the first coil 6-1 and the guide line 2 is approximately equal to that a second distance $l_2$ between the second coil 6-2 and the guide line 2, a first voltage detected by the first coil 6-1 is approximately equal to a second voltage detected by the second coil 6-2. Therefore, there exists no differential voltage between the two. In contrast with this, when the vehicle 1 skews or is misaligned with respect to the guide line 2 as shown in FIG. 2(B), since the first distance $l_1$ is longer than the second distance $l_2$, the first voltage detected by the first coil 6-1 is lower than the second voltage detected by the second coil 6-2. Therefore, there exists a differential voltage between the two. In response to this differential voltage, the steering motor 5 is driven in the direction that the differential voltage is reduced to approximately zero. The offset signals detected by the two offset detecting coils 6 are feedbacked to the main computer 11 through a steering chopper control interface 11b. Further, a vehicle speed signal detected by a vehicle speed sensor 20 is also applied to the main computer 11 through the same interface 11b.

The driving motor control unit 12 includes only the driving transistor chopper circuit 12a and connected to the main computer 11 through a driving chopper control interface 11a by way of the data bus 14a.

Similarly, the steering motor control unit 13 includes only the steering transistor chopper circuit 13a and connected to the main computer 11 through the steering chopper control interface 11b by way of the data bus 14b.

The operation of the unmanned vehicle control system shown in FIG. 1 will be described hereinbelow. The unmanned vehicle 1 is operated in accordance with command signals outputted from the fixed host computer 3. The command signals from the host computer 3 is supplied to the main computer 11 through the fixed and movable receivers/transmitters 7 and 8. The vehicle 1 is controlled in accordance with program stored in the main computer 11 in response to the command signals supplied from the fixed host computer 3.

The driving DC motor 4 is driven by the driving motor control unit 12 in response to various command signals such as "forward", "reverse", 10 km/h speed, etc. generated from the main computer 11. The steering DC motor 5 is driven by the steering motor control unit 13 in response to various command signals such as "leftward", "rightward" etc. (because the guide line 2 is branched) generated from the main computer 11 and additionally the feedback signal obtained by the two offset detecting coils 6-1 and 6-2 and the speed signal detected by the speed sensor 20. Further, the driving and steering motors 4 and 5 are both additionally controllable in accordance with command signals generated from the input/output unit 17 such as travel loop designation, travel speed designation etc. peculiar to each vehicle.

Further, in FIG. 1, the numeral 21 denotes a steering motor overcurrent detector, the detected signal by which is also applied to the main computer 11 through the steering interface 11b. The numeral 22 denotes a steering position sensor, the detected signal by which is also applied to the main computer 11 through the steering interface 11b to guide the vehicle along a branched guide line.

A driving motor activating signal $S_1$ is outputted from the main computer 11 through the driving control interface 11a to the driving motor power transistor chopper circuit 12a to drive the vehicle 1 at an appropriate speed in the forward or rearward direction. In the chopper circuit 12a, the duty ratio of DC motor driving current is controlled in response to the signal $S_1$. A vehicle speed signal $S_2$ detected by the vehicle speed sensor 20 is applied to the main computer 11 through the steering interface 11b (not through the driving interface 11a) to control the steering device according to detected vehicle speed or to indicate the present vehicle speed on an indicator provided in the display 17 shown in FIG. 1. Further, in case some elements (e.g. resistor) included in the chopper circuit 12a detects an abnormally high current, an "abnormal" signal $S_3$ is applied to the main computer 11 through the driving interface 11a to stop the driving motor 4 in an emergency.

A steering motor activating signal $S_5$ is outputted from the main computer 11 through the steering control interface 11b to the steering power transistor chopper circuit 13a to drive the steering device so that the vehicle 1 travels along the guide rail 2. In the chopper circuit 13a, the duty ratio of DC motor driving current is controlled in response to the signal $S_5$. An offset signal $S_6$ detected by the offset detecting coils 6 is feedbacked to the main computer 11 through the steering interface 11b to control the steering device so that the detected offset value is minimized. Further, in case the overcurrent sensor 21 detects an overcurrent in the steering motor 5, an overcurrent signal $S_8$ is applied to the main computer 11 through the steering interface 11b to stop the steering motor 5 in an emergency. A steering position signal $S_7$ detected by the steering position sensor 22 is applied to the main computer 11 through the steering interface 11b to guide the vehicle 1 along an appropriate guide line whenever the vehicle 1 reaches a branched guide line position.

Although not shown in FIGS. 1, other sensors or switches are provided for the vehicle 1 and these sensor signals are all applied to the main microcomputer 11. These switches are, for instance, a safety bumper switch closed to stop the vehicle when the vehicle is brought into contact with something, an obstacle sensor which outputs a signal when some obstacles are detected near the vehicle, cargo loading/unloading switches closed when a cargo, material, semi-finished product etc. are required to be loaded/unloaded from the vehicle, a battery voltage check switch closed when battery voltage drops below a predetermined level. Further, the main computer 11 receives the signals transmitted from the fixed phost computer 3 and decodes the signals, where necessary.

As described above, in the unmanned vehicle control system according to the present invention, since an offset signal indicative of vehicle misalignment away from the guide line is directly feedbacked to the main computer 11 through the steering interfaced 11b in real time, it is possible to use the movable main computer effectively, reduce necessary elements mounted on the vehicle, and economize power consumed by the control system, thus improving reliability of the system while realizing a small-sized unmanned vehicle control system. Additionally, there exists a distinguished advantage such that the main computer 11 can directly diagnose the driving chopper control unit 12 and the steering chopper control unit 13.

The first embodiment of the system and the method of controlling the steering device according to the present invention will be described hereinbelow in more detail.

With reference to FIG. 1, the main computer 1 mounted on the unmanned vehicle is provided with the following means or functions. An offset calculating means 101 calculates the magnitude of offset on the basis of signals detected by the offset detecting coils 6-1 and 6-2. In more detail, since the greater the offset value, the greater the difference in voltage level between the two coils, it is possible to obtain the magnitude of offset in dependence upon the difference in voltage level between the two.

A vehicle speed comparing means 102 compares vehicle speed with a first reference value and with a second reference value (greater than the first value) and generates a low speed signal when the detected vehicle speed is less than the first reference value, a medium speed signal when the detected vehicle speed is more than the first reference value but less than the second reference value, and a high speed signal when the detected vehicle speed is more than the second reference value.

Figure 3:
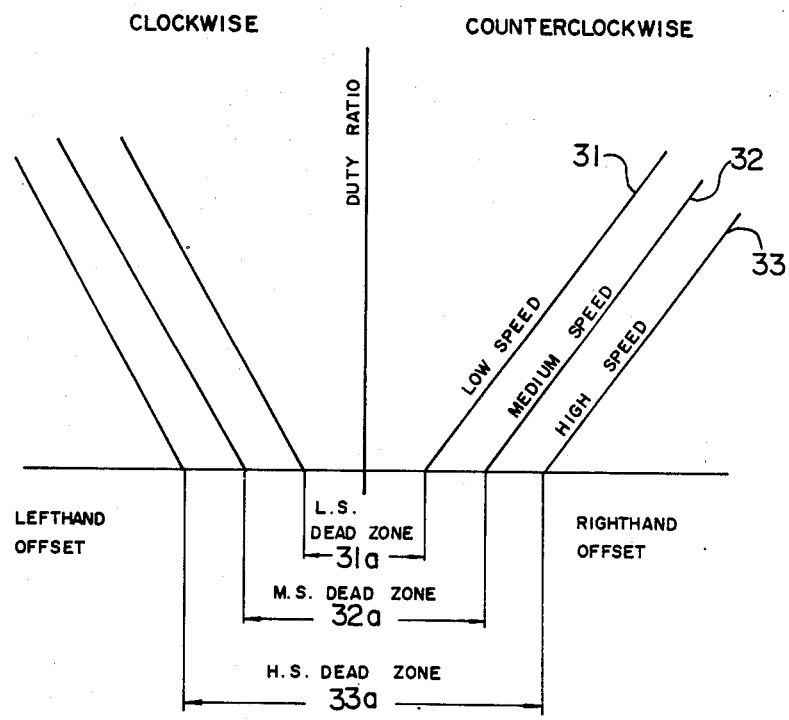
FIG. 3 is a graphical representation showing three dead zones and three duty ratio calculating expressions, which are both set in the main microcomputer of a first embodiment of the unmanned vehicle control system and method according to the present invention.

A dead zone and duty ratio expression setting means 103 determines various dead zones and duty ratio expressions according to detected vehicle speed. With reference to FIG. 3, the dead zone setting means 103 selects or reads a first dead zone 31a and a first duty ratio expression 31 from a memory unit provided in the main computer 11 in response to the low speed signal, a second dead zone 32a a little wider than the first dead zone and a second duty ratio expression in response to the medium speed signal, a third dead zone 33a a little wider than the second dead zone and a third duty ratio expression in response to the high speed signal.

An offset comparing means 104 compares the calculated offset value with the selected dead zone 3. When the calculated offset is less than the dead zone, the steering chopper 13a is turned off; when the calculated offset is more than the dead zone, the steering 13a is turned on to correct the steering.

A duty calculating means 105 calculates an appropriate duty ratio of current supplied from the steering chopper circuit 13a to the steering DC motor 5 according to the magnitude of detected offset values. To calculates the duty ratio, it is possible to use predetermined expresisons (e.g. linear expressions or quadric expressions). Or else, it is possible to select an appropriate duty ratio in accordance with table look-up method. In this case, various duty ratio are previously stored in a memory unit of the main microcomputer 11 according to various offset values being calssified by vehicle speeds.

A time measuring means 106 measures a fixed time period. This function can be achieved by counting a predetermined number of clock pulses.

The above functions can be implemented in accordance with program stored in a read-only-memory in the main computer 11.

FIG. 3 shows an example of linear expressions along which the duty ratio is calculated when the detected offset value changes. In the graphical representation, when the vehicle is travelling at low speed, a first low speed linear expression 31 is selected; when the vehicle is travelling at medium speed, a second medium speed linear expression 32 is selected; when the vehicle is travelling at high speed, a third high speed linear expression 33 is selected. As readily understood by FIG. 3, the low speed dead zone 31a corresponds to a point of intersection of the first low speed expression 31 and the abscissa (zero duty ratio); the medium speed dead zone 31a corresponds to a point of intersection of the second medium speed expression 32 and the abscissa; the high speed dead zone 33a corresponds to a point of intersection of the third high speed expression 33 and the abscissa.

FIG. 3 indicates that (1) even if there exists a small offset lying within each dead zone, the duty ratio of current supplied to the steering motor 5 is zero (the offset or misalignment is no longer corrected); (2) the width of dead zone increases with increasing vehicle speed being classified into three ranges; (3) the duty ratio of current supplied to the steering motor 5 increases with decreasing vehicle speed even if the same degree of offset is detected. In other words, when the vehicle is travelling at low speed, the dead zone is narrow but the steering misalignment is corrected relatively sharply by increasing the duty ratio of the steering motor current.

Figure 4:
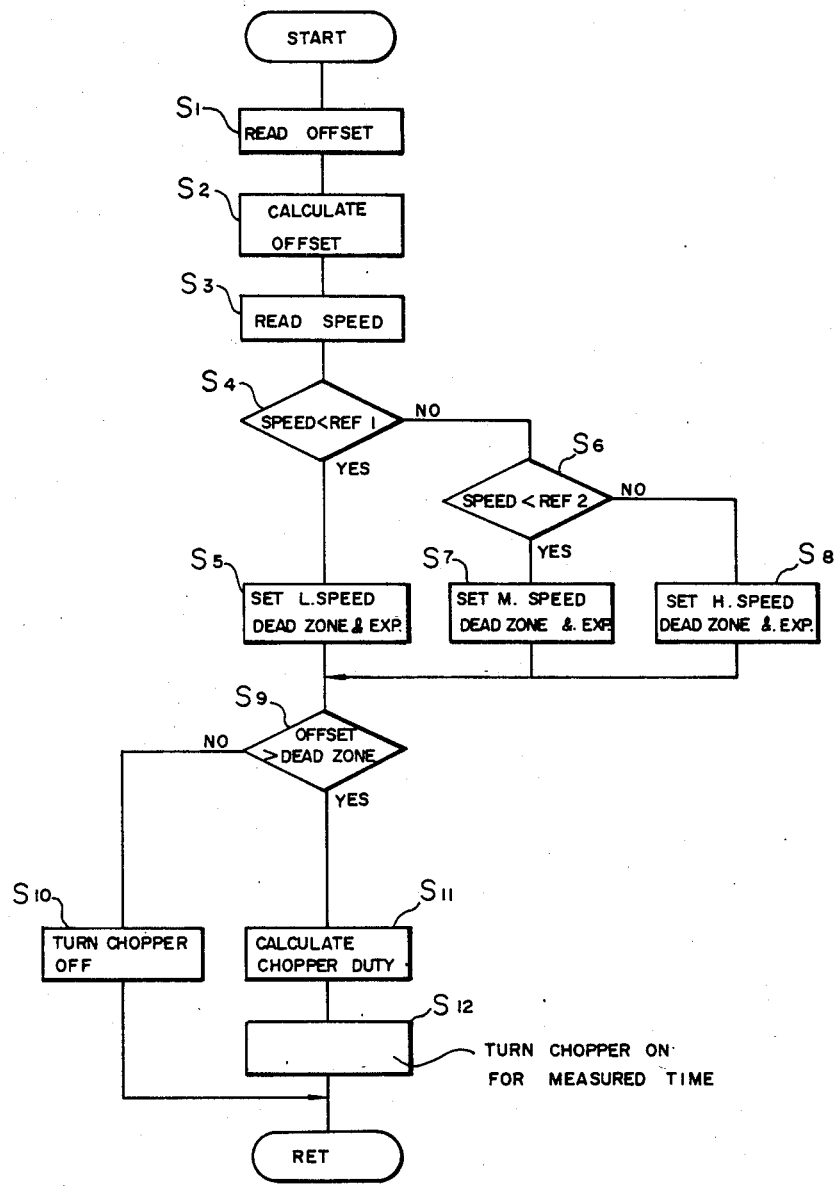
FIG. 4 is a flowchart showing control operation of the first embodiment of the unmanned vehicle control system and method according to the present invention.

The operation of the first embodiment of the steering device control system will be explained hereinbelow with reference to a flowchart shown in FIG. 4. Program control is repeatedly implemented at regular time intervals on the basis of interruption operation to the main computer 11.

First, control reads two voltages detected by the offset detecting coils 6 (in step $S_1$). Control calculates an offset value in dependence upon the difference in voltage level between two offset detecting coils 6 (in step $S_2$). The calculated offset value is stored temporarily in a random-access-memory provided in the main microcomputer 11. Control reads a vehicle speed detected by the vehicle speed sensor 20 (in step $S_3$) and compares the read vehicle speed with a first reference value (in step $S_4$). If the detected vehicle speed is less than the first reference value, since this indicates that the vehicle is travelling at a low speed, control reads and sets a low speed dead zone 31a and a low speed expression 31 (shown in FIG. 3) (in step $S_5$). If the detected vehicle speed is more than the first reference value, control further compares the detected speed with a second reference value greater than the first reference value (in step $S_6$). If the detected vehicle speed is less than the second reference value, since this indicates that the vehicle is travelling at a medium speed (greater than the first reference but smaller than the second reference), control reads and sets a medium speed dead zone 32a and a medium speed expression 32 (shown in FIG. 3) (in step $S_7$). If the detected vehicle speed is more than the second reference value, since this indicates that the vehicle is travelling at a high speed, control reads and sets a high speed dead zone 33a and a high speed expression 33 (shown in FIG. 3) (in step $S_8$). As described above, the dead zone and the expression is set being classified into threed groups (low speed, medium speed, high speed). On the basis of the set dead zone and expression, control operates the steering power transistor chopper circuit 13a as follows: Control compares an offset value calculated in step $S_2$ with a dead zone set in step $S_5$, $S_7$, or $S_8$. If the calculated offset value is less than the set dead zone, control turns off the steering chopper circuit 13a to allow the steering device to be inoperative (in step $S_{10}$), returning to the original step $S_1$. If the calculated offset value is more than the set dead zone, control calculates an appropriate duty ratio of current passed through the steering DC motor 5 according to the detected offset value and in accordance with table look-up method or an expression (in step $S_{11}$). In this step, three tables or expressions 31, 32 and 33 are prepared being classified into three groups (low speed, medium speed, high speed) as shown in FIG. 3, by way of examples. Therefore, a great duty ratio is calculated at low vehicle speed to drive the steering motor at high speed, but a small duty ratio is calculated at high vehicle speed to drive the steering motor at low speed. Upon calculation of an appropriate duty ratio, control sets counter function and turns on the steering chopper circuit (in step $S_{12}$). Within the time period measured by the control, the steering chopper circuit 13a is operated so as to supply current having the calculated duty ratio to the steering DC motor 5, so that the detected offset is corrected. When the measured time period has elapsed, control returns the original step $S_1$.

Figure 5A:
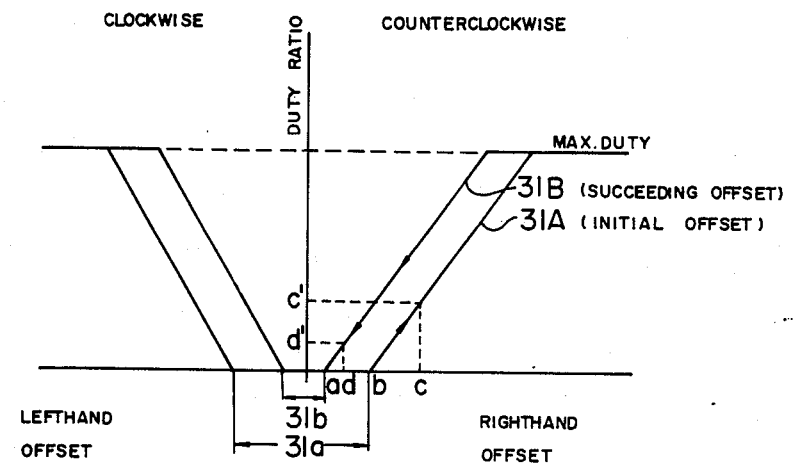
FIG. 5(A) is a graphical representation showing two dead zones and two duty ratio calculating expressions for low vehicle speed, which are both set in the main microcomputer of a second embodiment of the unmanned vehicle control system and method according to the present invention.
Figure 5B:
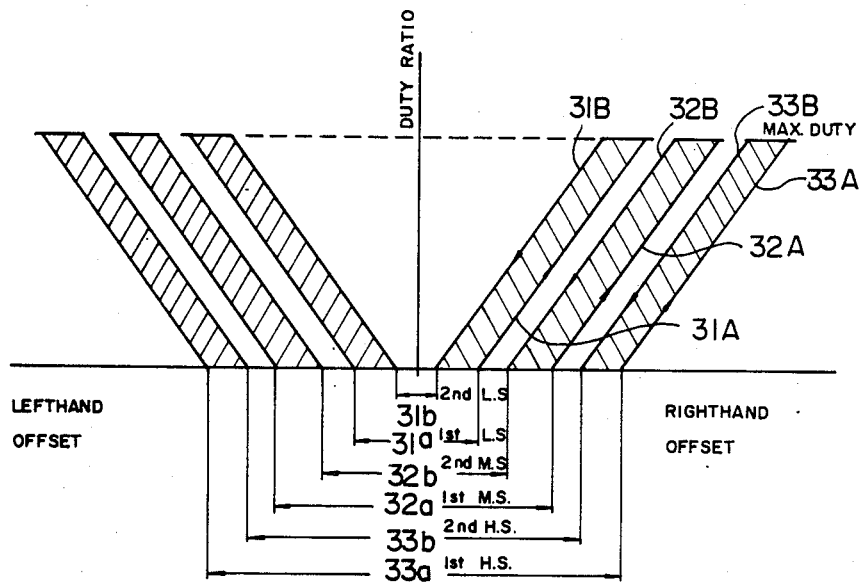
FIG. 5(B) is a graphical representation showing six dead zones and six duty ratio calculating expressions for low, medium, and high speed, which are all set in the main microcomputer of the second embodiment of the unmanned vehicle control system and method according to the present invention.
Figure 6:
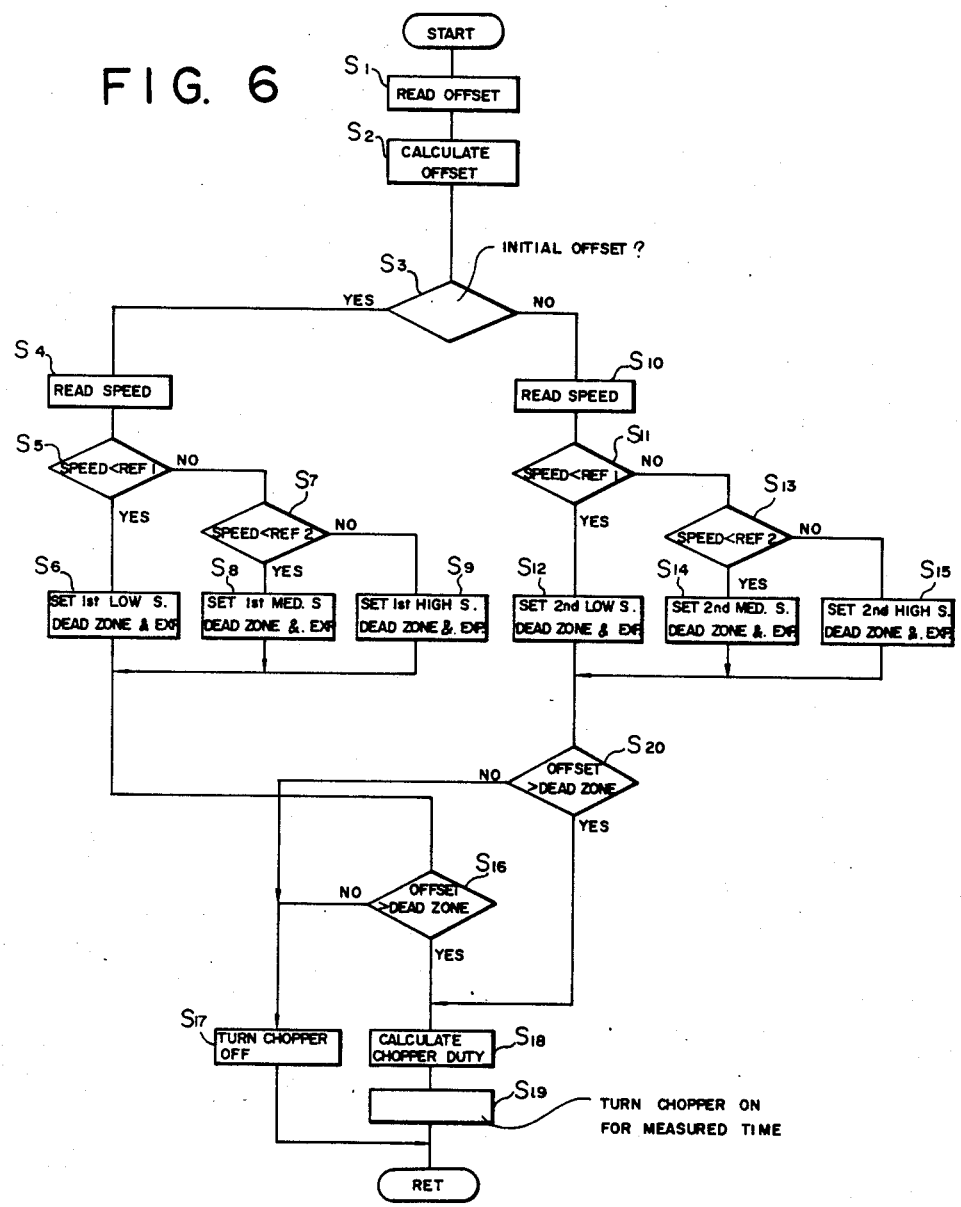
FIG. 6 is a flowchart showing control operation of the second embodiment of the unmanned vehicle control system and method according to the present invention.

With reference to FIGS. 5(A), 5(B) and 6, the second embodiment of the steering device control system and method according to the present invention will be described hereinbelow. The feature of the second embodiment is to further classify the dead zone by the initial offset and the succeeding (the second, third, ...) offset in addition to classify the dead zone by vehicle speed. The reason is as follows: when an intitial offset is detected, it is preferable to set a relatively wide dead zone and to correct the vehicle steering by activating the steering motor at relatively greater duty ratio (at high motor speed). However, when the initial offset has once be reduced into a small offset, it is rather preferable to set a relatively narrow dead zone and to correct the vehicle steering by activating the steering motor at relatively smaller duty ratio (at low motor speed).

FIG. 5(A) shows an example of two linear expressions along which the duty ratio is calculated when the detected offset value changes. In the graphical representation, when the vehicle is travelling at low speed, a pair of two low speed linear expressions 31A and 31B are selected. Additionally, when the initial offset is detected, the duty ratio is calculated along a first low speed expression 31A; when the succeeding offset is detected (when the offset still exists), the duty ratio is calculated along a second low speed expression 31B.

In more detail, assumption is made that the vehicle is misaligned in the rightward direction to an offset point c when the vehicle is travelling at low speed. Since the offset point c exceeds the first low speed dead zone 31a or b, the duty ratio c' is calculated along the first low speed expression 31A, so that the steering motor is quickly driven counterclockwise, for instance, to correct the misalignment (offset). As a result, the offset is reduced to an offset point d. Although the succeeding offset point d lies within the first low speed dead zone 31a, since the point d is out of the second low speed dead zone 31b or a, the duty ratio d' is calculated along the second low speed expression 31B, so that the steering motor is gently driven further counterclockwise, for instance, to correct the misalignment. As a result, the offset is reduced to within the second low speed dead zone 31b. Therefore, the steering chopper circuit is turned off to allow the steering device to be inoperative.

FIG. 5(B) shows a graphical representation similar to FIG. 5(A), in which two low speed expressions are shown by numeral 31; two medium speed expressions are shown by numeral 32; two high speed expressions are shown by numeral 33. Further, numeral 31a denotes a first low speed dead zone used when an initial offset is detected at low vehicle speed; numeral 31b denotes a second low speed dead zone used when the succeeding offset is detected at low vehicle speed; numeral 32a denotes a first medium speed dead zone used when an initial offset is detected at medium vehicle speed; numeral 32b denotes a second medium speed dead zone used when the succeeding offset is detected at medium vehicle speed; numeral 33a denotes a first high speed dead zone used when an initial offset is detected at high vehicle speed; numeral 33b denotes a second high speed dead zone used when the succeeding offset is detected at high vehicle speed.

The main computer 1 mounted on the unmanned vehicle is provided with the means or functions similar to those already explained in the first embodiment as shown in FIG. 1, therefore the description thereof being omitted herein.

The operation of the second embodiment of the steering device control system will be explained hereinbelow with reference to a flowchart shown in FIG. 6. Program control is repeatedly implemented at regular time intervals on the basis of interruption operation to the main computer 11.

First, control reads two voltages detected by the offset detecting coils 6 (in step $S_1$). Control calculates an offset value in dependence upon the difference in voltage level between two offset detecting coils 6 (in step $S_2$). The calculated offset value is stored temporarily in a random-access-memory provided in the main microcomputer 11. Control checks whether or not an offset is initially calculated (in step $S_3$). If the offset is an initial one, control reads a vehicle speed detected by the vehicle speed sensor 20 (in step $S_4$) and compares the read vehicle speed with a first reference value (in step $S_5$). If the detected vehicle speed is less than the first reference value, since this indicates that the vehicle is travelling at low speed, control reads and sets a first low speed dead zone 31a and a first low speed expression 31A (shown in FIG. 5) (in step $S_6$). If the detected vehicle speed is more than the first reference value, control further compares the detected speed with a second reference value greater than the first reference value (in step $S_7$). If the detected vehicle speed is less than the second reference value, since this indicates that the vehicle is travelling at a medium speed (greater than the first reference but smaller than the second reference), control reads and sets a first medium speed dead zone 32a and a first medium speed expression 32A (shown in FIG. 5) (in step $S_8$). If the detected vehicle speed is more than the second reference value, since this indicates that the vehicle is travelling at a high speed, control reads and sets a first high speed dead zone 33a and the first high speed expression 33A (shown in FIG. 5) (in step $S_9$). As described above, the dead zones and the expressions are classified into three groups (low speed, medium speed, high speed). On the basis of the set dead zones and expressions, control operates the steering power transistor chopper circuit 13a in the same manner as already described in the steps $S_9$, $S_{10}$, $S_{11}$, and $S_{12}$ of the first embodiment shown in FIG. 4.

Further, if the offset is not an initial one but the succeeding ones (the second, the third ...) (in step $S_3$), control reads a vehicle speed detected by the vehicle speed sensor 20 (in step $S_{10}$) and compares the read vehicle speed with the first reference value (in step $S_{11}$). If the detected vehicle speed is less than the first reference value, since this indicates that the vehicle is travelling at low speed, control reads and sets a second low speed dead zone 31b and a second low speed expression 31B (shown in FIG. 5) (in step $S_{12}$). If the detected vehicle speed is more than the first reference value, control further compares the detected speed with a second reference value greater than the first reference value (in step $S_{13}$). If the detected vehicle speed is less than the second reference value, since this indicates that the vehicle is travelling at a medium speed (greater than the first reference but smaller than the second reference), control reads and sets a second medium speed dead zone 32b and the second medium speed expression 32B (shown in FIG. 5) (in step $S_{14}$). If the detected vehicle speed is more than the second reference value, since this indicates that the vehicle is travelling at a high speed, control reads and sets a second high speed dead zone 33b and a second high speed expression 33B (shown in FIG. 5) (in step $S_{15}$). As described above, the dead zones and the expressions are classified into three groups (low speed, medium speed, high speed). On the basis of the set dead zones and expressions, control operates the steering power transistor chopper circuit 13a in the same manner as already described in the steps S$_9$, S$_{10}$, S$_{11}$ and S$_{12}$ of the first embodiment shown in FIG. 4.

In the above first and second embodiments, vehicle speeds have been classified into three (low, medium, high) speeds. However, without being limited to three groups, it is possible to classify vehicle speeds into other groups (two or four or more). Further, it is possible to freely determine the width of various dead zones and various expressions (linear, quadric, etc.) having different gradients.

As described above, in the steering control system and method for an unmanned vehicle according to the present invention, since the dead zone and the duty ratio calculated on the basis of offset value are both classified by vehicle speed, it is possible to stably correct the misalignment (offset) of an unmanned vehicle while the vehicle is travelling along a fixed guide line. For instance, since the dead zone is set wider at higher vehicle speed, the number of steering switchings (switching-over of steering motor from clockwise to counterclockwise or vise versa) can be reduced. Therefore, it is possible not only to prevent the vehicle from travelling zigzag along the guide line, but also to reduce the number of rush currents generated in the steering chopper circuit for protection of the circuit, while the vehicle is travelling at high speed. Further, since the dead zone is set narrower at lower vehicle speed, it is possible to finely correct the steering while the vehicle is travelling at low speed.

Additionally, in the second embodiment, since the dead zone and the duty ratio calculated on the basis of offset value are further divided into two cases, that is, where an initial offset is detected and where the succeeding offset is detected, it is possible to more finely control the steering operation of an unmanned vehicle.

It will be undestood by those skilled in the art that the foregoing description is in terms of a preferred embodiment of the present invention wherein various changes and modifications may be made without departing from the spirit and scope of the invention, as set forth in the appended claims.

What is claimed is:

1. An unmanned vehicle steering control system for controlling an unmanned vehicle so as to travel along a fixed guide line in response to command signals transmitted from a fixed host computer, which comprises:
   (a) steering motor means for steering the unmanned vehicle;
   (b) steering motor chopper means for generating a chopped current supplied to said steering motor means, the speed of said steering motor means increasing with increasing duty ratio of the chopped current;
   (c) vehicle offset detecting means for detecting an offset value of the unmanned vehicle misaligned away from the fixed guide line and generating an offset signal when the vehicle skews to the guide line;
   (d) vehicle speed detecting means for detecting vehicle speed and generating a vehicle speed signal; and
   (e) microcomputer means having:
      (1) steering control interface means for activating said steering motor chopper means in response to the offset signal generated from said vehicle offset detecting means and the vehicle speed signal generated from said vehicle speed detecting means;
      (2) offset calculating means for calculating a magnitude of offset on the basis of the offset signal generated by said vehicle offset detecting means;
      (3) vehicle speed comparing means for comparing vehicle speed with a first reference value and with a second reference value greater than the first reference value and generating a low speed signal when the detected vehicle speed is less than the first reference value, a medium speed signal when the detected vehicle speed is more than the first reference value but less than the second reference value, and a high speed signal when the detected vehicle speed is more than the second reference value;
      (4) dead zone and duty ratio function setting means for determining a low speed dead zone and a low speed duty ratio function with respect to detected offset values in response to the low speed signal, a medium speed dead zone wider than the low speed dead zone and a medium speed duty ratio function by which a smaller duty ratio can be determined as compared with the low speed duty ratio function in response to the medium speed signal, and a high speed dead zone wider than the medium speed dead zone and a high speed duty ratio function by which an even smaller duty ratio can be determined as compared with the medium speed duty ratio function in response to the high speed signal;
      (5) offset comparing means for comparing the calculated offset with the determined dead zone and generating a chopper turn-off signal when the calculated offset is less than the determined dead zone and a chopper turn-on signal when the calculated offset is more than the determined dead zone;
      (6) duty ratio calculating means for calculating an appropriate duty ratio of the chopped current supplied to said steering motor means with the determined duty ratio function;
      (7) time measuring means for measuring a predetermined time period; and
      (8) said microcomputer deactivating said steering motor chopper means in response to the chopper turn-off signal generated from said offset comparing means and activating said steering motor chopper means for the measured time period in response to the chopper turn-on signal generated from said offset comparing means on the basis of a duty ratio calculated by said duty ratio calculating means according to the detected offset value and in accordance with the determined duty ratio function.

2. The unmanned vehicle steering control system as set forth in claim 1, wherein said dead zone and duty ratio function setting means determining, when an initial offset is calculated, a first low speed dead zone and a first low speed duty ratio function in response to the low speed signal, a first medium speed dead zone and a first medium speed duty ratio function in response to the medium speed signal, and a first high speed dead zone and a first high speed duty ratio function in response to the high speed signal; and when the succeeding offset is calculated, a second low speed dead zone narrower than the first low speed dead zone and a second low speed duty ratio function by which a higher duty ratio can be determined as compared with the first low speed duty ratio function, a second medium speed dead zone narrower than the first medium speed dead zone and a second medium speed duty ratio function by which a higher duty ratio can be determined as compared with the first medium speed duty ratio function, and a second high speed dead zone narrower than the first high speed dead zone and a second high speed duty ratio function by which a higher duty ratio can be determined as compared with the first high speed duty ratio function.

3. A method of controlling an unmanned vehicle along a fixed guide line by means of a steering motor driven by a steering motor chopper in response to command signals transmitted from a fixed host computer, which comprises the following steps of:
   (a) detecting an offset value of the unmanned vehicle misaligned away from the fixed guide line;
   (b) detecting a vehicle speed;
   (c) comparing the detected vehicle speed with a firt reference value;
   (d) if the detected vehicle speed is less than the first reference value, setting a low speed dead zone and a low speed duty ratio function with respect to detected offset values;
   (e) if the detected vehicle speed is more than the first reference value, comparing the detected vehicle speed with a second reference value greater than the first reference value;
   (f) if the detected vehicle speed is less than the second reference value, setting a medium speed dead zone and a medium speed duty ratio function;
   (g) if the detected vehicle speed is more than the second reference value, setting a high speed dead zone and a high speed duty ratio function;
   (h) comparing the detected offset with the set dead zone;
   (i) if the detected offset is less than the set dead zone, turning off the steering motor chopper;
   (j) if the detected offset is more than the set dead zone, calculating an appropriate duty ratio of the chopped current supplied to the steering motor according to the detected offset value and in accordance with the set duty ratio function; and
   (k) turning on the steering motor chopper for a predetermined time period on the basis of the calculated duty ratio; and
   (l) repeating the above steps.

4. The method of controlling an unmanned vehicle as set forth in claim 3, which further comprises the following steps of:
   (a) determining whether the detected offset is an initial offset or a succeeding offset;
   (b) if the detected offset is an initial offset, setting a first low speed dead zone and a first low speed duty ratio function when the detected vehicle speed is less than the first reference value, a first medium speed dead zone and a first medium speed duty ratio function when the detected vehicle speed is more than the first reference value but less than the second reference value, and a first high speed dead zone and a first high speed duty ratio function when the detected vehicle speed is more than the second reference value; and
   (c) if the detected offset is a succeeding offset, setting a second low speed dead zone narrower than the first low speed dead zone and a second low speed duty ratio function by which a higher duty ratio can be determined as compared with the first low speed duty ratio function when the detected vehicle speed is less than the first reference value, a second medium speed dead zone narrower than the first medium speed dead zone and a second medium speed duty ratio function by which a higher duty ratio can be determined as compared with the first medium speed duty ratio function when the detected vehicle speed is more than the first reference value but less than the second reference value, and a second high speed dead zone narrower than the first high speed dead zone and a second high speed duty ratio function by which a higher duty ratio can be determined as compared with the first high speed duty ratio function when the detected vehicle speed is more than the second reference.

* * * * *